United States Patent
Connolly et al.

(10) Patent No.: US 11,389,767 B2
(45) Date of Patent: Jul. 19, 2022

(54) REDUCING MERCURY AIR AND WATER EMISSIONS FROM A COAL FIRED POWER PLANT WITHIN A FGD SYSTEM USING A BIOCIDE

(71) Applicant: BL Technologies, Inc., Minnetonka, MN (US)

(72) Inventors: Jeremy Connolly, Trevose, PA (US); Chuck Cunningham, Trevose, PA (US)

(73) Assignee: BL Technologies, Inc., Minnetonka, MN (US)

( * ) Notice: Subject to any disclaimer, the term of this patent is extended or adjusted under 35 U.S.C. 154(b) by 293 days.

(21) Appl. No.: 16/634,301

(22) PCT Filed: Apr. 18, 2018

(86) PCT No.: PCT/US2018/028111
§ 371 (c)(1),
(2) Date: Jan. 27, 2020

(87) PCT Pub. No.: WO2019/027516
PCT Pub. Date: Feb. 7, 2019

(65) Prior Publication Data
US 2020/0230549 A1    Jul. 23, 2020

Related U.S. Application Data (60) Provisional application No. 62/541,256, filed on Aug. 4, 2017.

(51) Int. Cl.
| | | |
|---|---|---|
| *C02F 1/76* | (2006.01) | |
| *C02F 1/72* | (2006.01) | |
| *B01D 53/78* | (2006.01) | |
| *B01D 53/64* | (2006.01) | |
| *B01D 53/50* | (2006.01) | |
| *C02F 103/18* | (2006.01) | |

(52) U.S. Cl.
CPC ........... *B01D 53/64* (2013.01); *B01D 53/502* (2013.01); *B01D 53/78* (2013.01); *C02F 1/722* (2013.01); *C02F 1/76* (2013.01); *B01D 2251/104* (2013.01); *B01D 2251/106* (2013.01); *B01D 2251/108* (2013.01); *B01D 2251/206* (2013.01); *B01D 2257/602* (2013.01); *B01D 2258/0283* (2013.01); *C02F 2103/18* (2013.01); *C02F 2209/36* (2013.01); *C02F 2303/04* (2013.01)

(58) Field of Classification Search
CPC ........ C02F 2303/04; C02F 1/008; C02F 1/76; C02F 1/722; C02F 2103/18; C02F 2101/20; C02F 2209/36; B01D 2257/602; B01D 2251/206; B01D 53/502; B01D 53/78; B01D 2258/0283; B01D 2251/106; B01D 53/64; B01D 2251/104; B01D 2251/108; F23J 15/04
See application file for complete search history.

(56) References Cited

U.S. PATENT DOCUMENTS

| | | | |
|---|---|---|---|
| 4,802,994 A * | 2/1989 | Mouche | .................... C02F 1/50 210/759 |
| 4,802,996 A | 2/1989 | Mouche et al. | |

FOREIGN PATENT DOCUMENTS

| | | |
|---|---|---|
| CN | 1736557 A | 2/2006 |
| CN | 1879946 A | 12/2006 |
| CN | 105451555 A | 3/2016 |
| CN | 106268259 A | 1/2017 |
| JP | H01293121 A | 11/1989 |
| WO | 2015017705 A1 | 2/2015 |

OTHER PUBLICATIONS

Office Action issued in Chinese Application No. 201880064962.X, dated Aug. 4, 2021, English translation appended, 17 pages.
Office Action issued in Indian Application No. 202017004517, dated Jul. 29, 2021, 5 pages.
International Search Report and Written Opinion dated Jul. 6, 2018, issued in related International Application No. PCT/US2018/028111; 21 pages.

* cited by examiner

*Primary Examiner* — Timothy C Vanoy
(74) *Attorney, Agent, or Firm* — Armstrong Teasdale LLP (57) ABSTRACT

A method for controlling mercury emissions within a FGD system, the method includes preparing a treatment composition for application on FGD system components, the treatment composition comprising a biocide, applying the treatment composition to an FGD system, wherein the FGD system includes an FGD scrubber, monitoring the bacterial load present within the FGD system, and optimizing the operating conditions of an aqueous system to determine when additional treatment is required.

10 Claims, 8 Drawing Sheets

Sample Name: SECONDARY CLARIFIER | Lab Sample ID: WOLO160609002

| Parameter Name | Result | Units | Reporting Limit |
|---|---|---|---|
| Microscopic Examination | | | |
| Biological materials | 50-75% | | |
| Exopolymer-encapsulated bacteria | Predominant (>= 50%) | | |
| Dispersed bacteria | Minor (<10%) | | |
| Cyanobacteria | Minor (<10%) | | |

| Sample Name: SECONDARY CLARIFIER PIN FLOC | | Lab Sample ID: WOLD160511025 | | |
|---|---|---|---|---|
| Parameter Name | | Result | Units | Reporting Limit |
| Microscopic Examination | | | | |
| Biological materials | | 0-25% | - | |
| Exopolymer-encapsulated bacteria | | Predominant (>= 90%) | - | |
| Test Comments | | Microscopic examination done on material scraped off of filter. Sample was dry when received and biological content may have been underestimated | | |
| FTIR Analysis of the Dried Deposit | | | | |
| Carboxylate | | Major | - | |
| Elemental Analysis by SEM-EDX | | | | |
| Sodium, Na | | 2.8 | % | 1.0 |
| Magnesium, Mg | | 28.8 | % | 1.0 |
| Al | | 16.0 | % | 1.0 |
| Silicon, Si | | 1.9 | % | 1.0 |
| Phosphorus, P | | 29.8 | % | 1.0 |
| Sulfur, S | | 12.0 | % | 1.0 |
| Chlorine, Cl | | 1.9 | % | 1.0 |
| Potassium, K | | 1.9 | % | 1.0 |
| Calcium, Ca | | <1.0 | % | 1.0 |

FIG. 3

| LAB No. | SAMPLE ID/SOURCE | TEST | * | RESULT |
|---|---|---|---|---|
| M32452 | Absorber 1 | Bacterial ID | P | *Acinetobacter lwoffi* |
| | | Aerobic Plate Count | | 57 cfu / 100 ml |
| | | Anaerobic Plate Count | | 11 cfu / 100 ml |
| | | Algae ID | | Negative |
| | | Iron Reducing Bacteria | | Positive |
| | | Sulfur Reducing Bacteria | | Positive |

| Sample point | Max Count | Ideal count |
|---|---|---|
| FGD Absorbers | 10 | 0 |
| FGD Reagent Feed tanks | 20 | <10 |
| FGD Purge Tanks | 200 | <100 |
| FGD Makeup water tanks | 10 | 0 |

FIG. 8

REDUCING MERCURY AIR AND WATER EMISSIONS FROM A COAL FIRED POWER PLANT WITHIN A FGD SYSTEM USING A BIOCIDE

CROSS-REFERENCE TO RELATED APPLICATION

This application is a national phase of International Patent Application No. PCT/US2018/028111 filed Apr. 18, 2018, which claims priority to U.S. Provisional Patent Application Ser. No. 62/541,256 filed Aug. 4, 2017, the entireties of which are herein incorporated by reference.

FIELD OF INVENTION

The present invention relates to methods and compositions for treatment of a flue gas desulfurization (FGD) system, and more particularly, to the application of a biocide to control microbial growth in a FGD scrubber to effectively reduce mercury emissions.

BACKGROUND OF THE INVENTION

Coal-fired power plants have extensive Air Quality Controls Systems place to reduce environmental pollution associated with burning coal. These systems typically include equipment to remove $SO_2$, NOR, particulates (dust), mercury, and the like. One of the common components within such systems is a flue gas desulfurization (FGD) scrubber. Wet FGDs utilize an alkaline slurry to remove acid gases from the flue gas and during this process, also capture additional pollutants such as metals including mercury.

Mercury air and water emissions from coal-fired power plants are becoming highly regulated to limit the pollution of this toxic heavy metal. For example, such regulation includes the US MATS (mercury and air toxic standards) rule, the US ELG (effluent limit guidelines for power plants) rule, and the EU BREF document for LCP (large combustion plant). Controlling mercury emissions can prove both difficult and costly to a power plant.

Traditional ways of removing mercury include, for example, activated carbon injection (ACI), halogen/oxidizer addition to the coal or furnace, re-emission additive addition to the wet FGD, installing an SCR, installing specific oxidation catalysts to the SCR, upgrading the particulate removal device, or additional filtration of the waste water (as the mercury is mostly small particles that are making it through the system to the effluent).

However, the previous techniques for reduction of mercury are not sufficiently effective and, owing to their sometimes high additional capital costs and the additional consumption of operating media are relatively expensive. Additionally, installing new equipment or operations to remove mercury is not desired.

Thus, it is desirable to provide methods and compositions that obviate and mitigate the shortcomings of the prior art, while successfully improving efficiency of removal of mercury emissions by optimizing operations of existing equipment, which can greatly reduce the cost of compliance with mercury emissions requirements.

SUMMARY OF THE INVENTION

It was surprisingly discovered that the application of a biocide to a FGD scrubber has a significant impact on the mercury emissions emanating from a wet FGD, from both the air and water exit streams.

In one aspect of the present invention, a method for controlling mercury emissions within a FGD system. The method comprises preparing a treatment composition for application on FGD system components, applying the treatment composition to a FGD system, monitoring the bacterial load present within the FGD system, and optimizing the operating conditions of an aqueous system to determine when additional treatment is required.

In some embodiments, the treatment composition comprises a biocide. In other embodiments, the biocide is a non-oxidizing biocide. In some embodiments, the non-oxidizing biocide comprises a blend of about 1-10% of 2-Bromo-2 nitropropane-1,3, diol and about 1-10% of isothiazolone. In other embodiments, the non-oxidizing biocide is selected from the group consisting of ammonium salts, glutaraldehyde, DBNPH and isothiazolinones.

In some embodiments, the treatment composition further includes an oxidizer. In some embodiments, the oxidizer is selected from sodium hypochlorite (bleach), chlorine hypobromous acid, bromine, bromide salts, hydroxyorganic acids, ozone or hydrogen peroxide.

In some embodiments, the FGD system components include FGD absorbers, FGD reagent feed tanks, FGD purge tanks or FGD makeup water tanks. In some embodiments, the FGD system is a FGD scrubber.

In another aspect of the present invention, the monitoring the bacterial load present within the FGD system is controlled or monitored by an ATP test. This provides an effective monitoring and control mechanism for mercury emissions using a biocide.

In some embodiments, the aqueous system includes wastewater treatment system. In some embodiments, optimizing the operating conditions includes measuring the water balance of an aqueous system to determine the mercury concentration in a wastewater treatment effluent.

DETAILED DESCRIPTION OF EXEMPLARY EMBODIMENTS

The invention will now be described in the following detailed description, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements, but may include other elements not expressly listed or inherent to such process, method article or apparatus. The singular forms "a," "an" and "the" include plural referents unless the context clearly dictates otherwise.

The present invention provides a method for controlling biological activity within a FGD system. The method of the present invention impacts the biological growth within a scrubber and reduces mercury emissions from both air and water exit streams.

The method of the present invention provides applying a treatment composition to FGD system components or a FGD scrubber. FGD scrubbers produce scaling wastewater that requires treatment to meet discharge regulations. Packed-bed scrubbers, also called wet scrubbers or absorbing towers, are pieces of equipment installed in power plants to remove selected gases (and sometimes additionally particulates) from combustion fumes in order to meet emission standards.

In some embodiments, the FGD scrubber components include FGD absorbers, FGD reagent feed tanks, FGD purge tanks, FGD makeup water tanks, or the like. The chemical composition of FGD scrubber material varies according to, for example, the scrubbing process, type of coal, sulfur content, and presence or absence of fly ash. In exemplary embodiments of the present invention, the FGD scrubber is a natural oxidation or forced oxidation scrubber with the alkaline slurry generated by addition of a calcium-based material such as lime and/or limestone, or sodium- or magnesium-based materials. The treatment composition of the present invention further includes a biocide. In some embodiments, the treatment composition is used to treat a FGD slurry and wastewater.

In some embodiments, a non-oxidizing biocide is employed. Non-oxidizing biocides attack certain organs of the micro-organism, such as the cell wall or reproductive system. The application of a non-oxidizing biocide to the scrubber has a significant impact on biological growth within the scrubber, which ultimately affects the impact on mercury emissions emanating from the wet FGD, from both the air and water exit streams. In some embodiments, the treatment of the FGD absorbers with a non-oxidizing biocide results in the reduction of mercury air and water emission concentration.

In the exemplary embodiments, a biocide is applied to a FGD scrubber to control microbial growth. In some embodiments, the biocide is a non-oxidizing biocide.

In some embodiments, the non-oxidizing biocide includes a blend of about 1-10% of 2-Bromo-2 nitropropane-1,3, diol and about 1-10% of isothiazolone. In some embodiments, the 1-10% of isothiazolone includes a mixture of chloro and non-chloro 2-methyl-4-isothazonlin-3-one. In other embodiments, the non-oxidizing biocide is selected from ammonium salts, glutaraldehyde, DBNPH, isothiazolinones, or the like. In some embodiments, the additional components of the non-oxidizing biocide include water, citrate, sulfuric acid, and epsom salt.

In some embodiments, the non-oxidizing biocide is added at a concentration of between 0.001 and 100 ppm depending on the type of biocide and the cleanliness of the system water. In some embodiments, the biocide or non-oxidizing biocide is added to the aqueous systems using a suitable pump and/or timer system.

In some embodiments, the treatment composition of the present invention includes an oxidizing treatment. In some embodiments, the oxidizer can be selected from sodium hypochlorite (bleach), chlorine hypobromous acid, bromine, bromide salts, peroxides, peroxyorganic acids, ozone or hydrogen peroxide.

The method includes applying the treatment composition to a FGD system. In some embodiments, application of the treatment composition to a FGD system can be achieved by adding an aqueous mixture of the treatment composition to the various water streams of the FGD, such as the inlet raw makeup water, the recirculating water, the purge water before solids separation, or the like.

The present invention further requires monitoring the bacterial load present within the FGD system. One key aspect of the present invention provides that by maintaining the biological counts/growth within a FGD system, air and water mercury excursions can be mitigated. In some embodiments, the monitoring of the bacterial load can be controlled or monitored by an ATP test, or other known commercial techniques. In some embodiments, the use of biological monitoring across a FGD system allows operating plants to determine the normal operating conditions of a system and helps determine when a treatment or additional treatment is required.

In some embodiments, biological activity can be monitored through the use of a Bioscan meter and/or dip slides, commercially available ATP tests, or the like. In some embodiments, the increase in biological concentrations is directly related to the amount of air and water emissions of mercury.

Further, the method of the present invention provides optimizing the operating conditions of an aqueous system to determine when additional treatment is required. One benefit of optimizing the operating conditions includes improving the efficiency of removal of mercury within existing operating equipment. This greatly reduces the cost of compliance with mercury emissions requirements.

In some embodiments, the aqueous system includes a wastewater treatment system to treat the water stream to remove dissolved and suspended species to acceptable levels.

In some embodiments, optimizing the operating conditions includes measuring the water balance of the aqueous system to determine the mercury concentration in a wastewater treatment effluent.

EXPERIMENTAL

Figure 1:
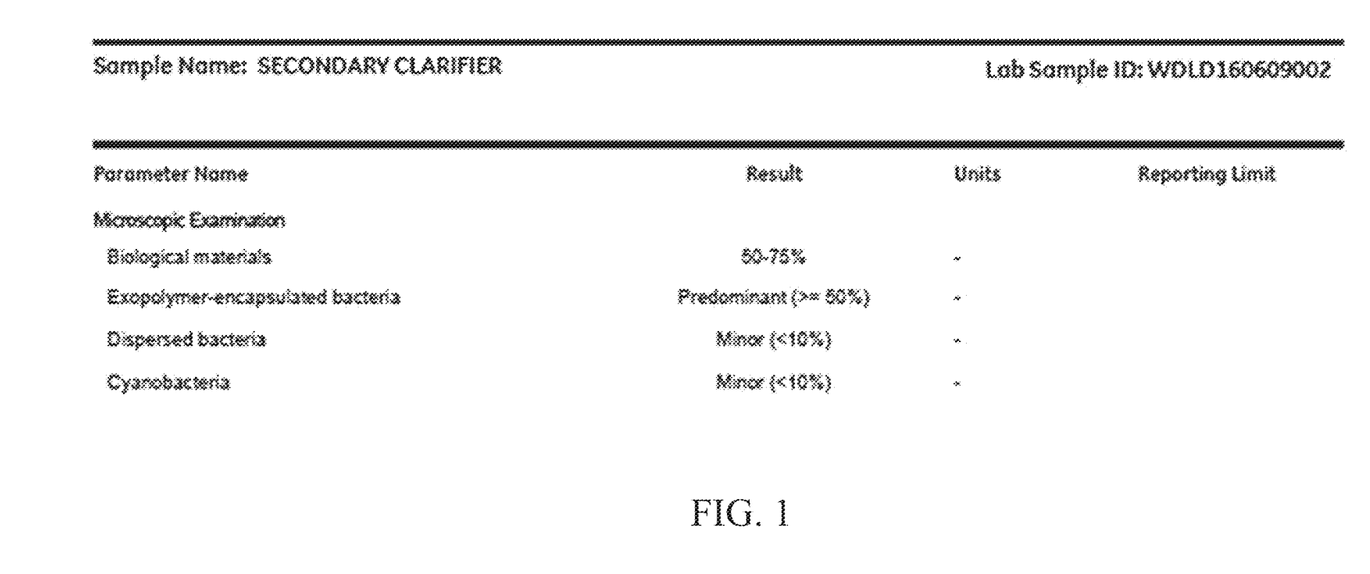
FIG. 1 is chart providing floc carryover results obtained from biological materials tested.
Figure 2:
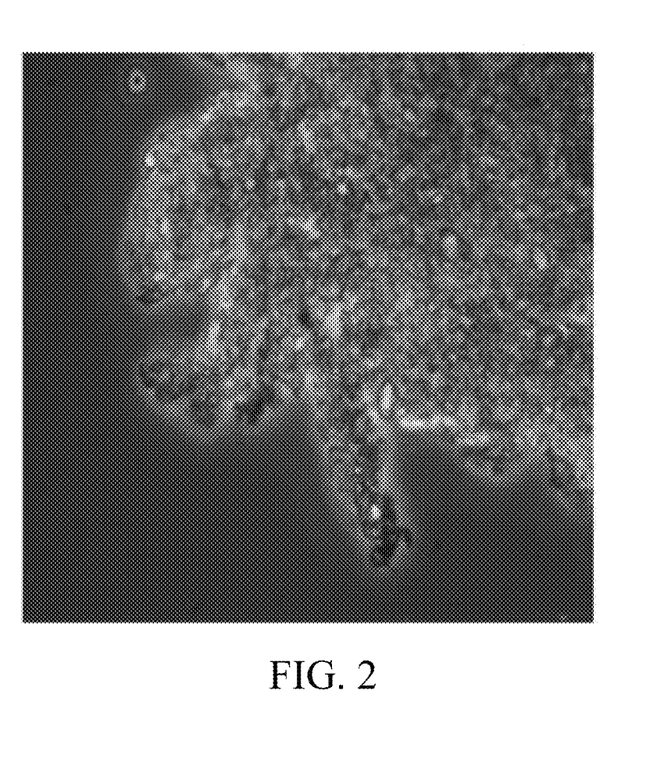
FIG. 2 is a photomicrograph of a secondary clarifier sample showing bacteria.
Figure 3:
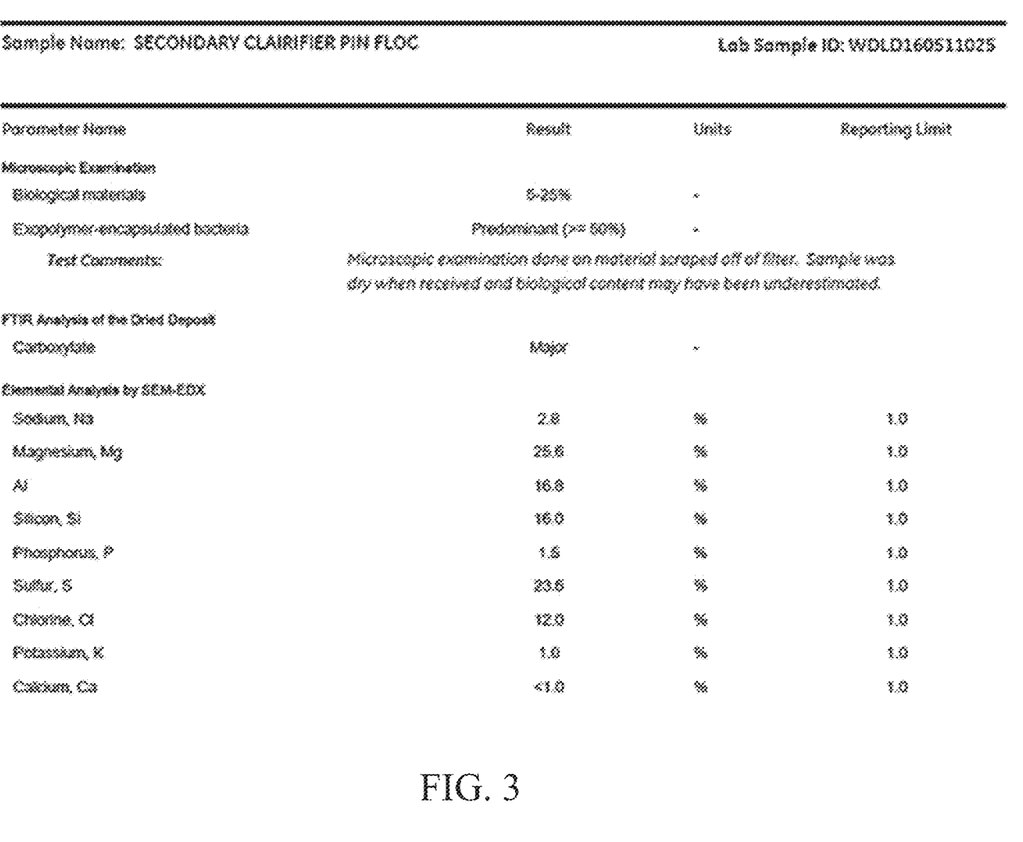
FIG. 3 is chart providing floc carryover results obtained from biological materials tested including elemental analysis.
Figure 4:
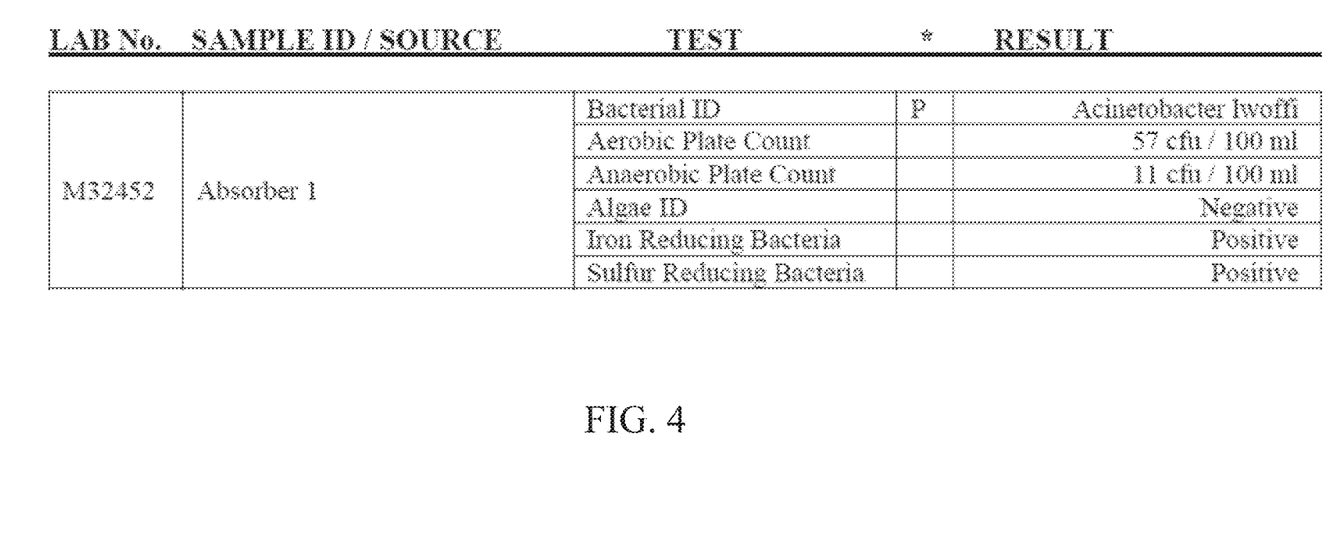
FIG. 4 is a table providing the microbial analysis for a FGD biological determination.
Figure 5:
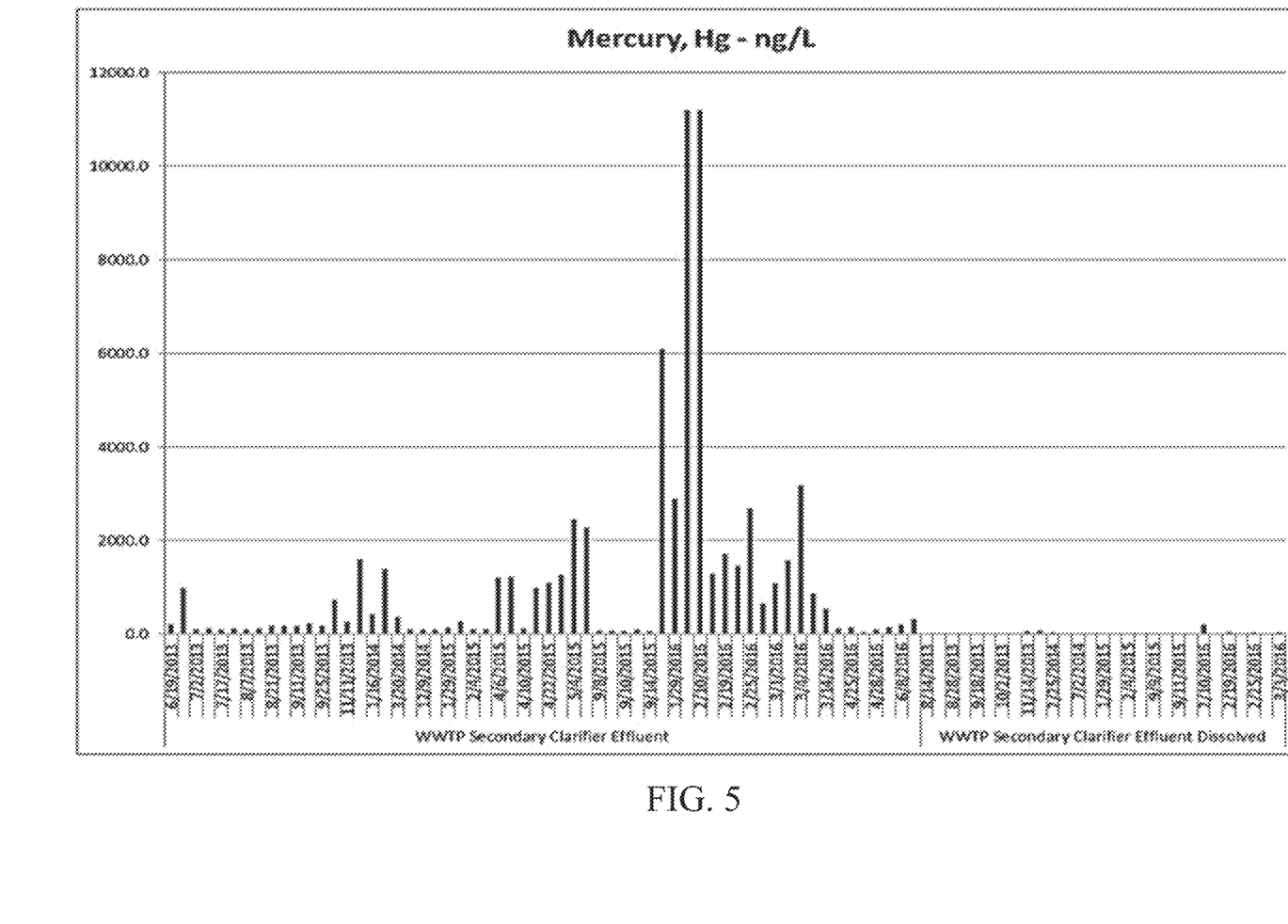
FIG. 5 is a graph providing the CPS effluent mercury concentration overtime.
Figure 6:
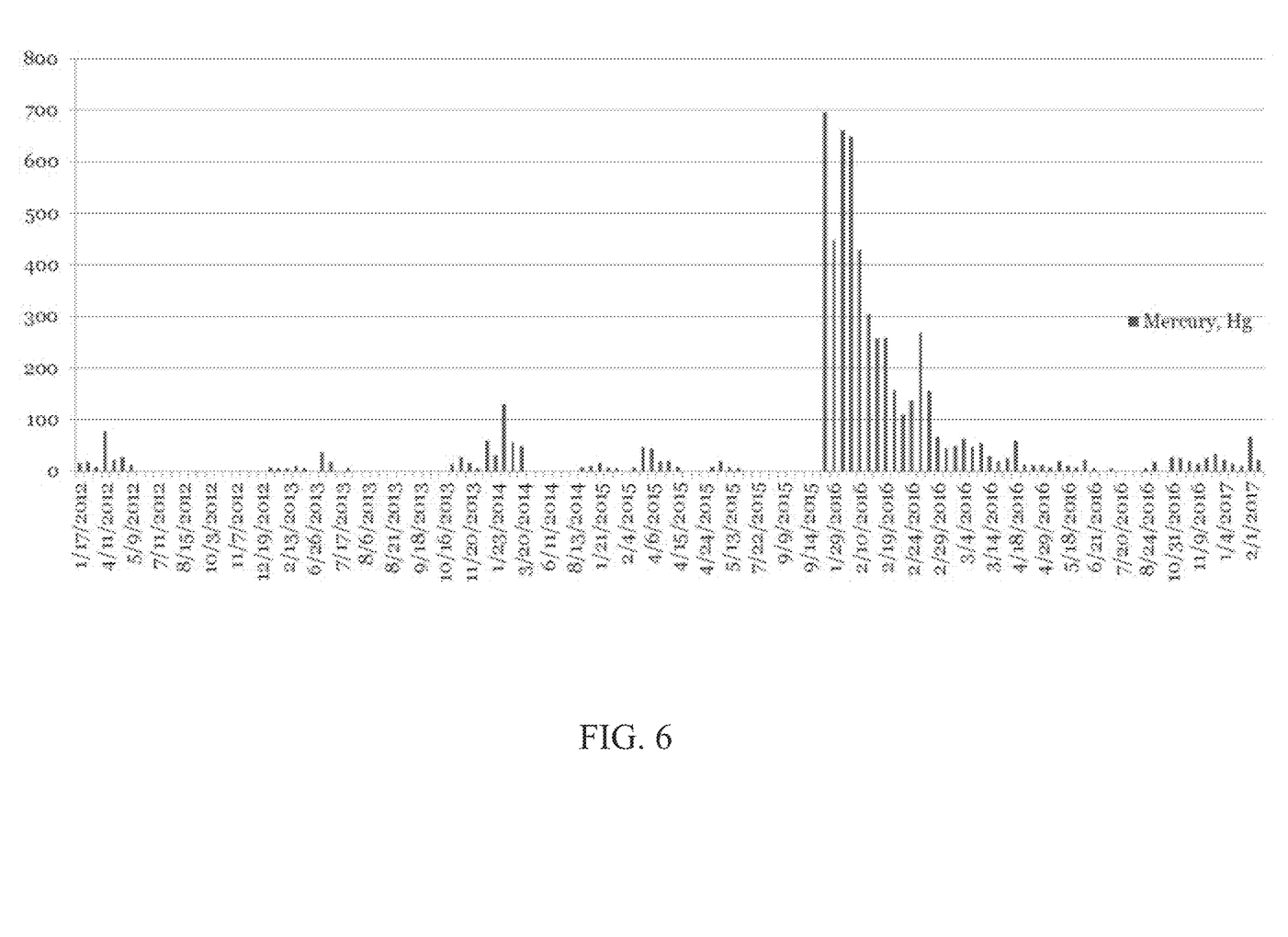
FIG. 6 is a graph providing the trend in the concentration of bioreactor effluent mercury.
Figure 7:
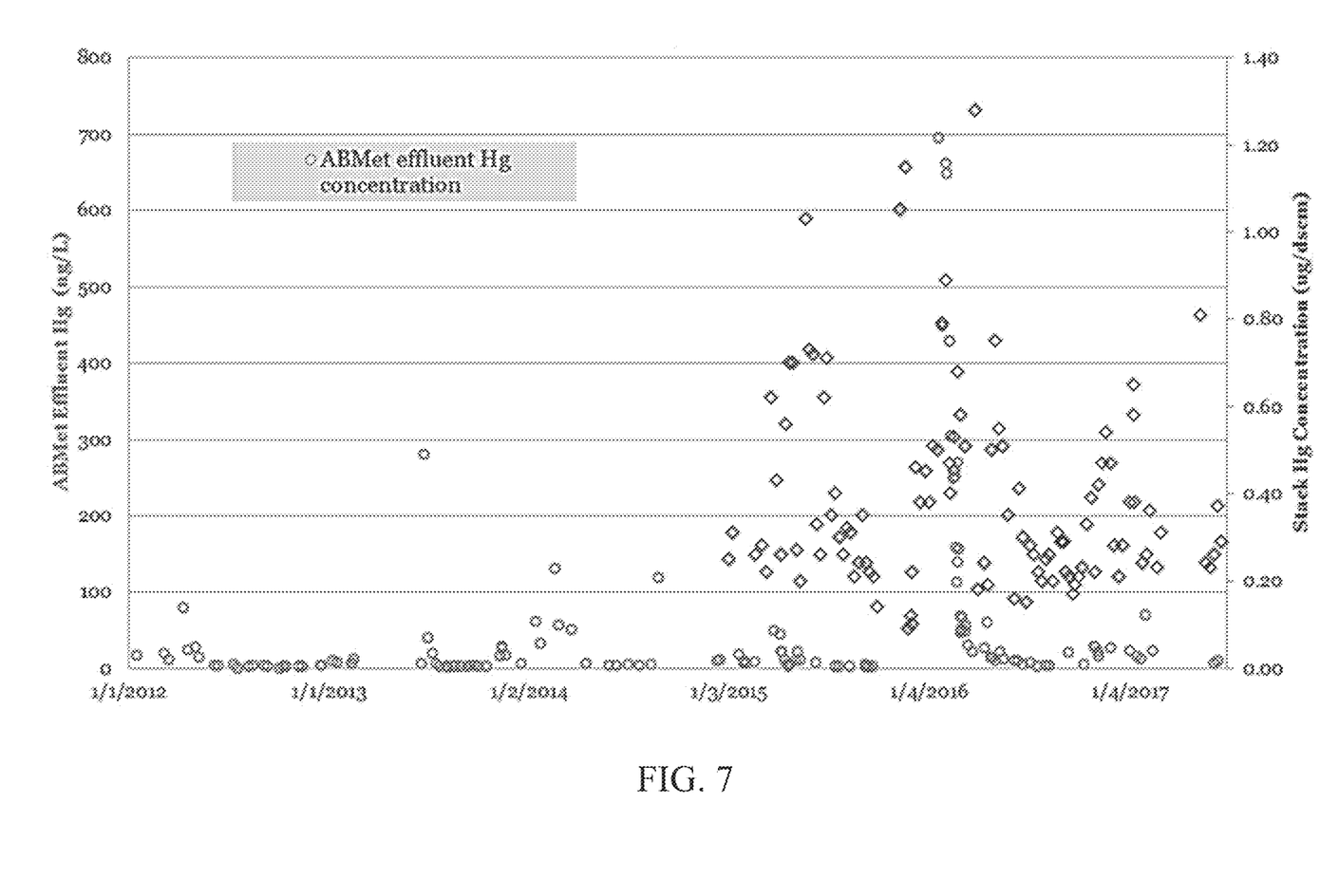
FIG. 7 is a graph providing the ABMet effluent mercury concentration and stack mercury concentration overtime.
Figure 8:
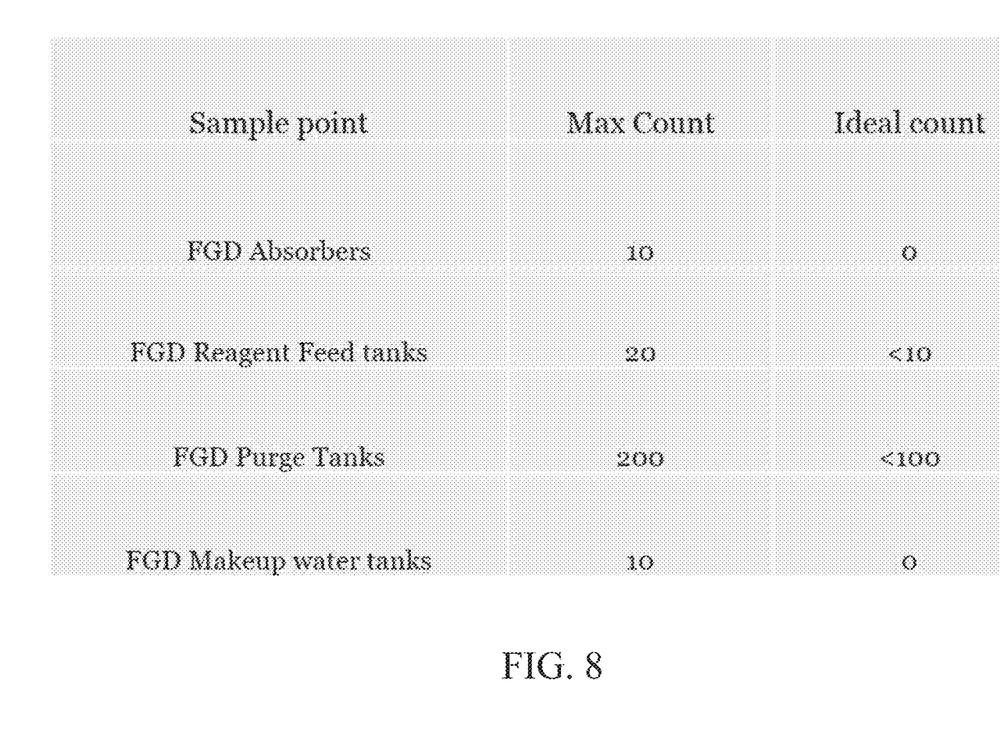
FIG. 8 is a table providing the biological counts within different FGD system components and locations.

During an upset excursion on a FGD wastewater treatment system, testing was completed on solids carryover to determine their composition. As shown in FIG. 1, lab testing was completed and the following results were obtained.

As can be shown in FIG. 1, about 50-75% of the floc carryover was found to be from biological materials. Other general observations during this time frame included the presence of foam within the FGD absorbers, septic smells at wastewater treatment and an abnormal consistency of wastewater treatment sludge. This sample was to extensively monitored and used to treat the FGD system for biological activity. The treatment plan has shown to mitigate both air and water mercury excursions since implementation of the plan. The treatment has also eliminated the prior noted general observations.

The treatment plan was established using the following materials: a Bioscan Meter, Dipslides, a non-oxidizing biocide, and a halogen or oxidizing treatment. Mercury testing was carried out at the AEP accredited Dolan Laboratory and biological testing was carried out at the GE Woodlands Laboratory. Both a halogen and non-oxidizing biocide was used to treat FGD slurry and waste water.

Treatment of the FGD absorbers with a non-oxidizing biocide resulted in a reduction of MATS mercury concentration. Based on a water balance of the system, it was observed to have a reduction of mercury concentration in wastewater treatment effluent after a period of 5 days. A maintenance dose of halogen was added to the FGD wastewater streams as well to control biological concentrations across the system. This resulted in a reduction of floc carryover and mercury emissions. Mercury is approximately <95% insoluble, therefore reducing the amount of floc carryover reduced the Chloride Purge Steam effluent mercury concentration.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for controlling mercury emissions within a FGD system, the method comprising:
    preparing a treatment composition for application on FGD system components, said treatment composition comprising a biocide;
    applying said treatment composition to an FGD system, wherein said FGD system is an FGD scrubber;
    monitoring the bacterial load present within said FGD system; and
    optimizing the operating conditions of an aqueous system to determine when additional biocide treatment is required, wherein said optimizing the operating conditions includes measuring the water balance of said aqueous system to determine the mercury concentration in a wastewater treatment effluent.

2. The method as recited in claim 1, wherein said FGD system components include FGD absorbers, FGD reagent feed tanks, FGD purge tanks or FGD makeup water tanks.

3. The method as recited in claim 1, wherein said biocide is a non-oxidizing biocide.

4. The method as recited in claim 3, wherein said non-oxidizing biocide comprises a blend of 1-10% of 2-Bromo-2 nitropropane-1,3, diol and about 1-10% of isothiazolone.

5. The method as recited in claim 3, wherein said non-oxidizing biocide is selected from the group consisting of ammonium salts, glutaraldehyde, DBNPH and isothiazolinones.

6. The method as recited in claim 1, wherein said treatment composition further includes an oxidizing biocide.

7. The method as recited in claim 6, wherein said oxidizing biocide is selected from sodium hypochlorite, chlorine hypobromous acid, bromine, bromide salts, hydroxyorganic acids, ozone or hydrogen peroxide.

8. The method as recited in claim 1, wherein said monitoring the bacterial load is controlled or monitored by an ATP test.

9. The method as recited in claim 1, wherein aqueous system includes wastewater treatment system.

10. The method as recited in claim 1, wherein said optimizing the operation conditions includes controlling and monitoring the biological activity in the FGD system with said biocide.

* * * * *